United States Patent [19]
Kita

[11] 3,772,963
[45] Nov. 20, 1973

[54] MECHANICAL SERVO MEANS
[75] Inventor: Yasuo Kita, Obayashi-Aza-Nishiyama, Takarazuka-shi, Japan
[73] Assignee: Sumitomo Electric Industries, Ltd., Osaka, Japan
[22] Filed: Nov. 9, 1971
[21] Appl. No.: 196,998

[30] Foreign Application Priority Data
Apr. 9, 1971    Japan..........................46/22414

[52] U.S. Cl. .................................. 91/369 B, 91/376
[51] Int. Cl. ........................................... F15b 9/110
[58] Field of Search ..................... 91/369 A, 369 B, 91/369 R, 376

[56]         References Cited
        UNITED STATES PATENTS
3,009,445  11/1961  Wuellner........................... 91/369 B
3,033,173   5/1962  Bauman ............................. 91/369 B
3,316,816   5/1967  Yardley.............................. 91/369 B Primary Examiner—Paul E. Maslousky
Attorney—William D. Hall et al.

[57]              ABSTRACT

In a mechanical servo means for boosting an input force in which resilient means is disposed between a finger plate and a fulcrum plate to provide a resiliently displaceable fulcrum point therebetween whereby the boosting ratio can be changed in accordance with the input.

1 Claim, 13 Drawing Figures

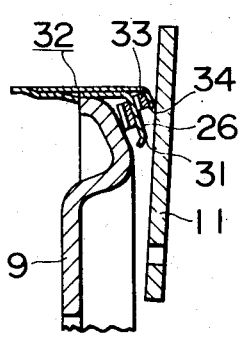
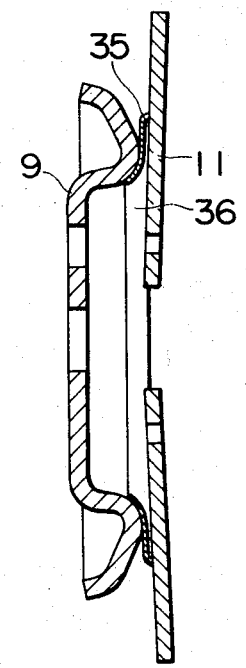
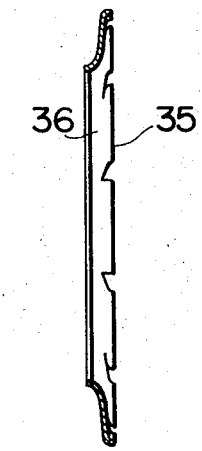
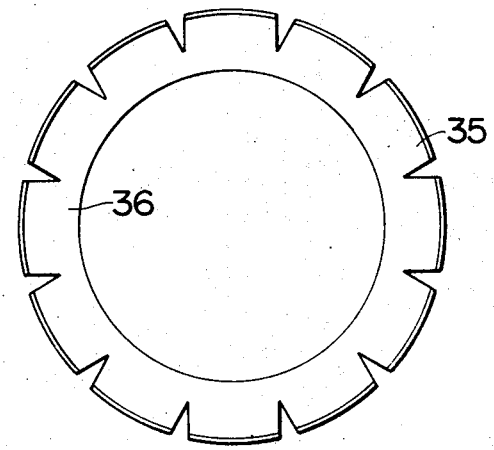

MECHANICAL SERVO MEANS

The present invention relates to a mechanical servo means and more particularly but not restrictively to a vacuum servo means adapted to be disposed for example between a master cylinder and a brake pedal for a fluid pressure brake system of an automobile for the purpose of boosting braking effect.

In an automobile brake system having a conventional servo means of this kind, there has been a limit in power boosting effect of the means and, once the limit is exceeded, the boosting ratio of the output to the input is abruptly decreased, giving unsteady feelings to the operator.

The present invention has an object to provide a servo means which is free from the aforementioned disadvantages of the conventional servo mechanism.

Another object of the present invention is to provide a mechanical servo means which has a lower boosting ratio under an increased pedal pressure or input than under a relatively small input, so that the ratio under an increased input becomes close to the boosting ratio when the limit is exceeded.

According to the present invention, the above objects can be achieved by an arrangement including a finger and a fulcrum plate which are forced into engagement by means of a diaphragm at variable fulcrum points, displaceable from positions in which a high boosting ratio is provided, to other positions in which a low boosting ratio is provided.

According to a further aspect of the present invention, a plurality of second positions may be provided so that said point of engagement between the finger and the fulcrum plate may be sequentially displaced to positions of sequentially decreasing boosting ratio. Thus, the present invention can provide sequentially varying power boosting ratio.

According to the present invention, it is also possible to employ the novel servo mechanism only in a rear wheel brake system for providing an optimum relation between the front wheel brake pressure and the rear wheel brake pressure.

In order to provide sequentially variable power boosting ratio by a displaceable point of engagement between the finger and the fulcrum plate, the present invention proposes to interpose a resilient member between the finger and the fulcrum plate. The resilient member provides a plurality of fulcrum points (the second position) between the finger and the fulcrum plate. As the pressure between the finger and the fulcrum plate increases, the resilient member is deformed and the fulcrum point is in effect displaced. The position of the fulcrum point, which varies as the resilient member is deformed, will determine the effective arm length of the finger so that it is possible to change the boosting ratio in accordance with the input.

The above and other objects and features of the present invention will become clear from the following descriptions taking reference to the accompanying drawings, in which;

FIG. 7 is a fragmentary sectional view of a further embodiment of the present invention;

FIG. 8 is a fragmentary sectional view of still further embodiment of the present invention;

FIG. 9 is a sectional view of an annular plate used in the arrangement of FIG. 8;

FIG. 10 is a plan view of the annular plate shown in FIG. 9;

Figure 1:
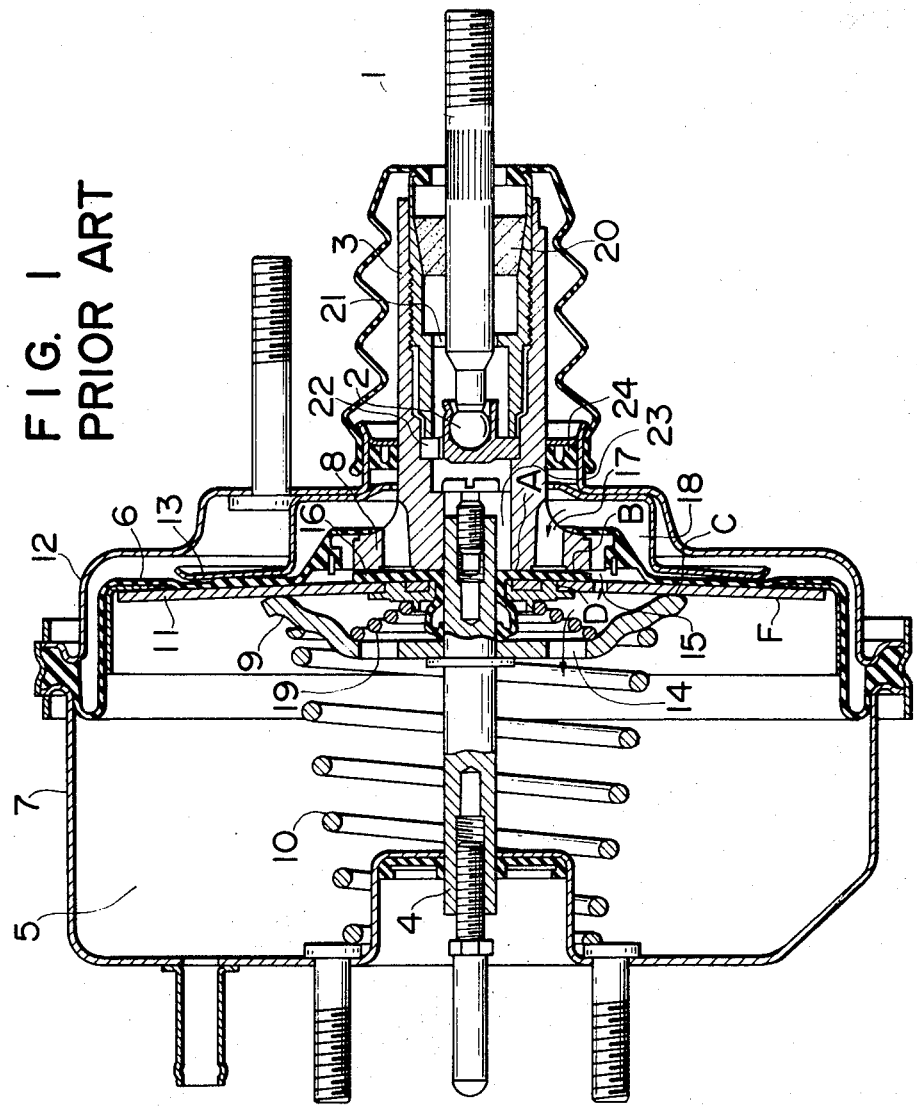
FIGS. 1 through 3 show longitudinal sectional views of a conventional arrangement in three different positions of operation.

Before the embodiments of the present invention are described, a conventional arrangement will now be explained making reference to FIGS. 1 through 3. In the known arrangement shown in FIGS. 1 through 3, there is provided an input push rod (1) which is connected through a ball joint (2) with a valve body (3). The rod (1) may be connected through a lever with a brake pedal of an automobile (not shown in the drawings). A booster push rod (4) which is co-axial with the valve body (3) and movable in the longitudinal direction is in turn connected at its left end with a master cylinder (not shown in the drawings). The arrangement provides a direct acting vacuum servo mechanism in which the force applied to the input push rod (1) is boosted by an atmospheric pressure acting on a diaphragm constituting the right-hand wall of a front chamber (5) which is connected to a vacuum source (not shown). The boosted force is then transmitted to the master cylinder.

The diaphragm (6) is a flexible disc which is in sealing connection at its outer periphery with a booster body (7) constituting the front chamber (5) and at its inner periphery with a flange (8) of the valve body (3). The diaphragm (6) is further urged by a return spring (10) interposed between a dish-shaped fulcrum plate (9) and the inner wall of the booster body (7), through a finger (11) in the form of a radially divided sector member, toward a dish-shaped rear plate (13) welded to a second booster body (12). The front chamber (5) is in communication, through holes (14) in the fulcrum plate (9), apertures (15) in the finger (11), a gap (B) between the flange (8) of the valve body (3) and a sealing plate (16) covering the right side surface of the center portion of the finger (11) and holes (17) in the flange (8) of the valve body (3), with a rear chamber (18). In the position shown in FIG. 1, vacuum is maintained both in the front chamber (5) and the rear chamber (18).

In the position of FIG. 1, the finger (11) is forced by the return spring (10) acting through the fulcrum plate (9) which is in contact with the finger (11) at fulcrum points shown by (c) in the drawing toward the diaphragm (6) and the rear plate (13). At the same time, the finger (11) is resiliently forced rightwardly at its center portion by a helical spring (19) which is supported at its one end by the right side surface of the fulcrum plate (9). The booster push rod (4) has a sealing plate (16) air tightly mounted thereon and urged onto the right hand edge (A) of the valve body under the action of the spring (19), so that the atmospheric pressure through a filter (20) and air passages (21), (22) and (23) are sealed out of the rear chamber (18) and the front chamber (5). Since the valve body (3) is held axially slidably by means of a cup-shaped seal (24) which serves to seal the gap between the cylindrical surface of the valve body and the booster body (12), the air pressure acting on the end surface of the valve body serves to force the body toward the left.

The helical spring (19) acting on the valve body (3) to force it toward the right is suitably balanced with the air pressure acting thereon to force it toward the left, so that the valve body takes the position shown in FIG. 1.

In operation of the vacuum servo means described above, the input push rod (1) is pushed toward the left to compress the spring (19). As the result, the finger (11) and the sealing plate (16) are displaced at their center portions toward the left through the position shown in FIG. 2 in which both the gaps (A) and (B) are closed by the sealing plate (16) to the position shown in FIG. 3 in which the gap (A) is opened but the gap (B) is closed. In the position of FIG. 3, the atmospheric pressure passes through the gap (A) into the rear chamber (18) to force the diaphragm (6) toward the left.

Figure 2:
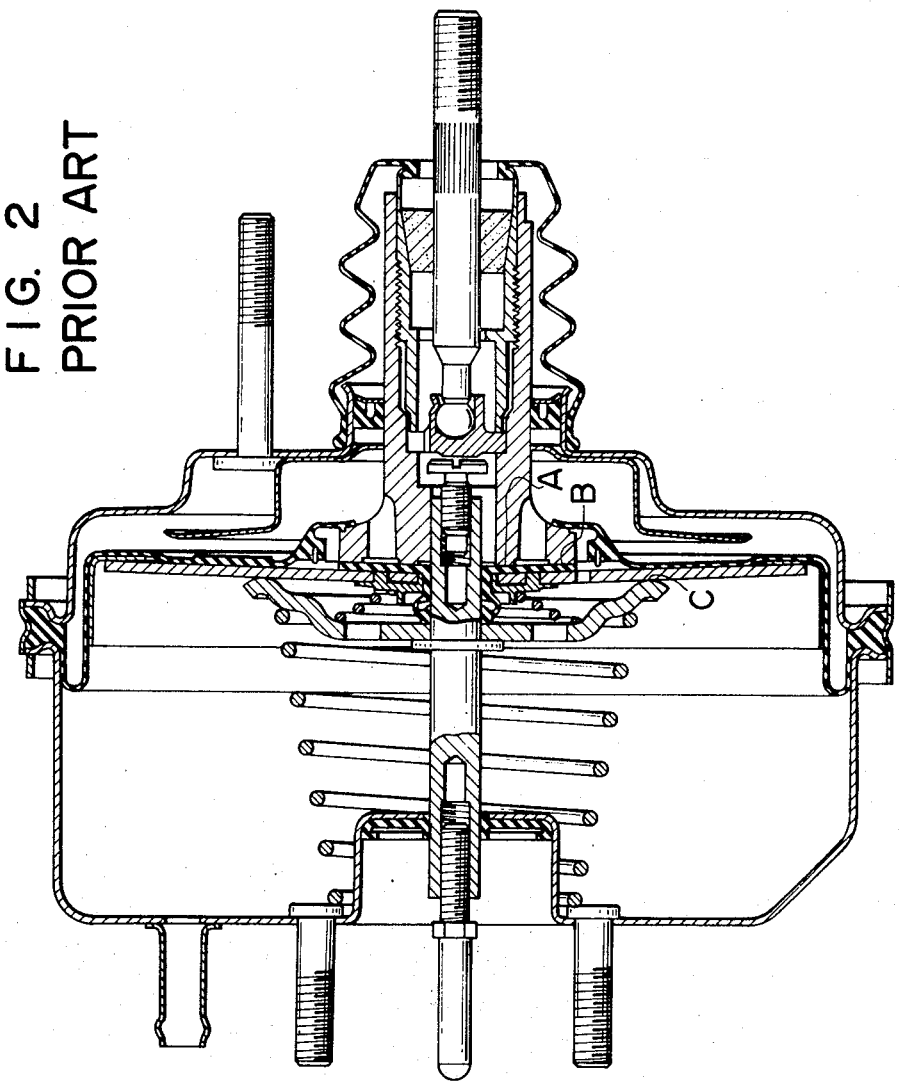

The pressure at the right side of the diaphragm (6) acts on the annular surface thereof, and, since the diaphragm is so designed that the resultant force acts on such points radially outwardly deviated from the points (c), each of the sector pieces constituting the finger (11) is pivoted about the corresponding fulcrum points (c) to the position shown in FIG. 2. Therefore, when the gaps (A) and (B) are closed as shown in FIG. 2, the first cycle of operation is completed. Thus, in response to the increase in the amount of leftward movement of the input push rod (1), the amount of air flow through the gap (A) increases, resulting in an increase in the pressure difference between the front chamber (5) and the rear chamber (18). In this manner, the diaphragm (6) is pushed toward the left by a distance proportional to the movement of the input push rod, so that the fulcrum plate (9) pushed by the finger (11) at the points (c) in turn pushes the booster push rod (4) with a boosted force against the action of the return spring (10).

Figure 3:
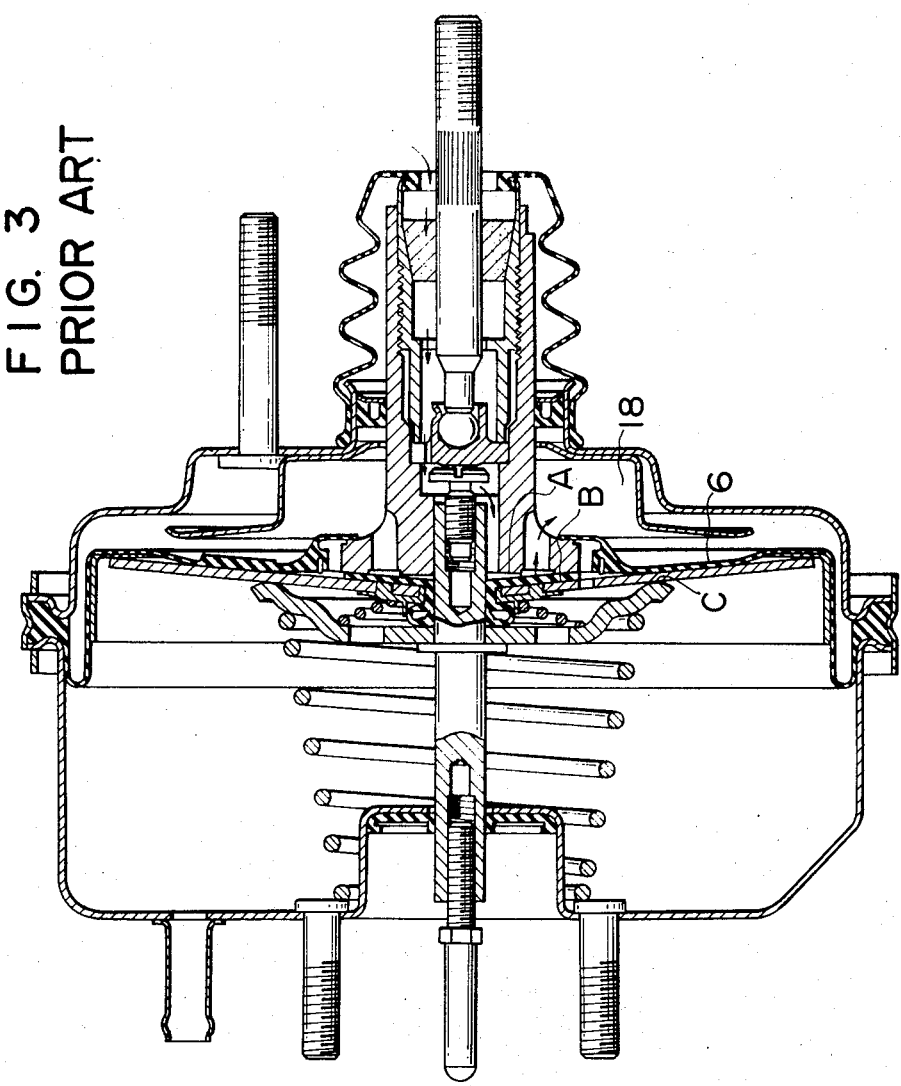

In the known arrangement shown in FIGS. 1 through 3, in order that the parts are moved from the transient position shown in FIG. 3 to the balanced position shown in FIG. 2, the resultant force acting on the diaphragm (6) at the point (F) must meet the following relation.

Input Force × Distance BC/Distance FC

In this instance, the output at the booster push rod (4) becomes the sum of the resultant force on the diaphragm (6) and the input. Thus, the output can be represented by the following equation.

Output Force = Input Force × (1 + Distance BC/Distance FC)

= Input Force (Distance BF/Distance FC)

Therefore, the boosting ratio is increased as the fulcrum point (C) comes closer to the point (F), provided that the fulcrum point (C) is located radially inwardly of the point (F).

Figure 4:
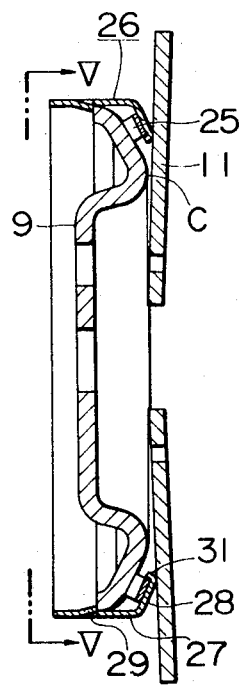
FIG. 4 shows a fragmentary sectional view of an arrangement in which the present invention is applied to the arrangement shown in FIGS. 1 through 3.
Figure 5:
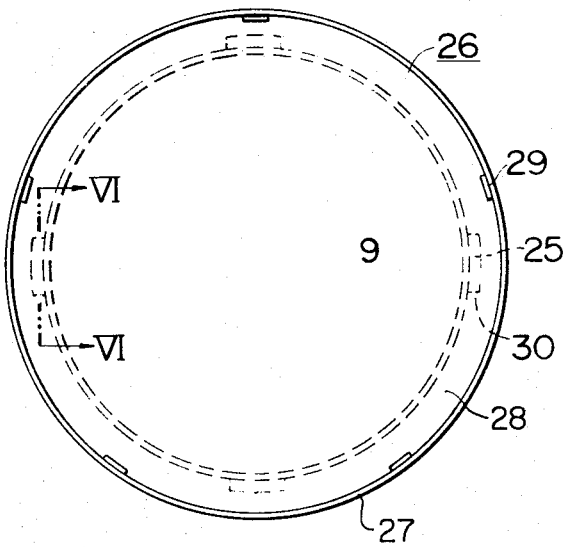
FIG. 5 is a view as seen along the line V—V in FIG. 4.
Figure 6:
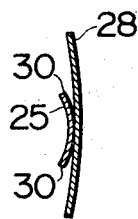
FIG. 6 is a sectional view taken along the line VI—VI in FIG. 5.

FIGS. 4 through 6 show an example of the resilient member in accordance with the present invention. In this example, four warped metallic plates (25) are held between the fulcrum plate (9) and the finger (11) by a spring retainer (26). As shown in FIG. 5 which shows a view as seen along the line V—V in FIG. 4, the retainer (26) comprises a cylindrical wall (27) and a conical wall (28), and is mounted on the fulcrum plate (9) by a plurality of nails (29) formed by raising portions of the cylindrical wall (27) and the aforementioned metallic pieces (25) welded at their intermediate portions to the inner surface of the conical wall (28) and each having two resilient ears (30). The curved edge (31) of the conical wall (28) is maintained in contact with the finger (11) to provide the second fulcrum point.

When the force exerted by the diaphragm to urge the finger (11) toward the left exceeds the resiliency of the ears (30), the spring retainer (26) is moved slightly toward the left so that the fulcrum point (C) on the fulcrum plate (9) comes into contact with the finger (11) resulting in a decrease in the boosting ratio.

FIG. 7 shows another example in which a second retainer (32) similar to the retainer (26) is disposed around the first retainer (26). The second retainer (32) has a second resilient member (33) and resiliently engages at its annular edge (34) of the conical wall thereof. The resilient force of the second resilient members (33) is smaller than that of the resilient members (25) so that the first resilient members (25) are not subjected to any remarkable deformation until the second resilient members (33) are deformed to the extent that the edge (31) of the first resilient member comes into contact with the finger (11). Thus, in the arrangement of FIG. 7, as the input increases, the fulcrum point on the finger plate is sequentially displaced radially inwardly, resulting in a decrease in the boosting ratio.

In a further example shown in FIGS. 8 through 10, an annular plate (36) having a plurality of resilient fingers (35) formed on the periphery thereof is disposed between the finger (11) and the fulcrum plate (9). Each of the resilient fingers (35) is normally in contact with the finger (11) at the tip end thereof to provide the second fulcrum point but, as the finger (11) is displaced leftwardly, each of the fingers (35) is deformed until the finger (11) is supported by the fulcrum plate at the first fulcrum point.

Figure 11:
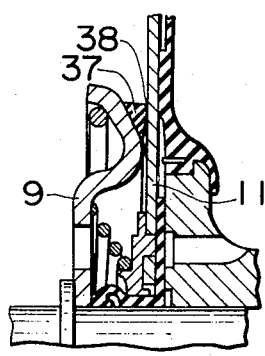
FIG. 11 is a fragmentary sectional view of a further embodiment of the present invention.

FIG. 11 shows another embodiment in which a rubber ring (37) of substantially triangular cross-section is disposed between the finger and the fulcrum plate. At an initial stage of operation in which the input is relatively small, the outermost annular edge (38) on the rubber ring (37) is in engagement with the finger (11) but, as the input increases, the rubber ring (37) is deformed. As a result, the effective fulcrum point between the rubber ring and the finger (11) gradually moves radially inwardly. Therefore, in the arrangement of FIG. 11, the boosting ratio continuously changes as long as the input is relatively small.

Figure 12:
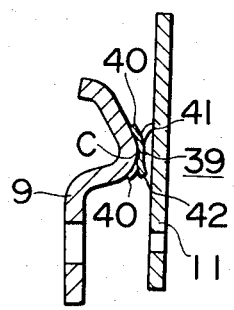
FIG. 12 is a fragmentary sectional view of a further embodiment of the present invention.
Figure 13:
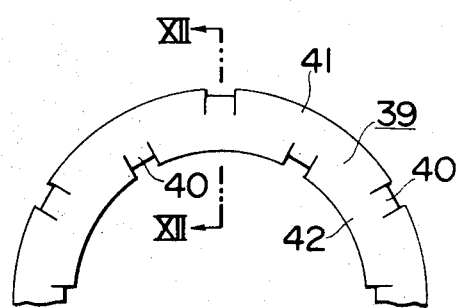
FIG. 13 is a fragmentary plan view of the embodiment shown in FIG. 12.

FIGS. 12 and 13 show another embodiment in which the boosting ratio decreases in response to an increase in the input when the input is relatively small but increases in response to the increase in the input when the input is relatively large. As in the previous embodiments, this arrangement includes an annular metal plate (39) which is disposed between the finger (11)

and the fulcrum plate (9) and has a plurality of (twelve in the case of the illustrated embodiment) finger pieces (40) formed at the inner and outer peripheries thereof by raising portions of the metal plate. The finger pieces (40) are placed in contact with the fulcrum plate (9) and the remaining portion of the metal plate (39) is slightly curved so that it contacts at its outer periphery with the finger (11) to form the second fulcrum point (41). The inner periphery of the metal plate (39) is also slightly curved toward the finger (11) so that it comes into contact therewith, when its outer periphery is deformed, so as to provide a third fulcrum point (42).

According to the illustrated arrangement, as the input increases, the finger (11) is gradually displaced toward the left as seen in FIG. 12 so that the fulcrum point on the finger (11) is sequentially moved from the point (41), through the point (42) to the first fulcrum point (C). Thus, the input is boosted at the initial stage with a relatively high ratio which is determined by the position of the second fulcrum point (41), then at the intermediate stage with a relatively low ratio which is determined by the position of the third fulcrum point (42), and thereafter at the final stage with a medium ratio which is determined by the position of the first fulcrum point (C).

As described above with reference to the preferred embodiments, the present invention enables to change the boosting ratio very easily by inserting a resilient member between a finger and a fulcrum plate, the resilient member serving to displace the fulcrum point on the finger in accordance with the input.

In the illustrated embodiments, the fulcrum point has been displaced with respect to the finger, however, it should of course be noted that the fulcrum point may be displaced with respect to the fulcrum plate.

I claim:
1. A mechanical servo means comprising:
a diaphragm having its outer periphery secured to a booster body and its inner periphery secured to a valve body to form a first chamber and a second chamber in the booster body;
a finger plate abutting at a portion thereof a side wall of said diaphragm and slidable with respect to a push rod;
a fulcrum plate secured to the push rod and urged by a return spring in one direction to engage at its outer periphery with the finger plate at a first fulcrum point located radially inwardly from a point to which the resultant force of the pressure on the diaphragm acts;
said push rod being inserted at its one end into the hollow portion of said valve body;
said valve body being provided with passage means for communicating said second chamber with atmosphere;
said finger plate having means for opening and closing said passage means;
said opening means being adapted also to control the communication between the first chamber and the second chamber;
characterized by at least one resilient means disposed between said finger plate and the fulcrum plate so as to form at least one additional fulcrum point which is radially deviated from said first fulcrum point whereby the effective fulcrum is displaced from the additional fulcrum point to the first fulcrum point when the resilient force is overcome by the force exerted by the finger plate toward the fulcrum plate,
at least one of said resilient means being mounted on said fulcrum plate, said resilient means comprising a spring retainer having a cylindrical wall and a conical wall, and plate members having ears and secured to the inner side of the conical wall, said conical wall providing the additional fulcrum point.

* * * * *